(12) United States Patent
Bocksrocker et al.

(10) Patent No.: US 12,115,595 B2
(45) Date of Patent: Oct. 15, 2024

(54) HAIRPIN WELDING METHOD AND APPARATUS

(71) Applicant: TRUMPF Laser—und Systemtechnik GmbH, Ditzingen (DE)

(72) Inventors: Oliver Bocksrocker, Sachsenheim (DE); Nicolai Speker, Pleidelsheim (DE); Jens Brueggebors, Schwieberdingen (DE)

(73) Assignee: TRUMPF LASER-UND SYSTEMTECHNIK GMBH, Ditzingen (DE)

( * ) Notice: Subject to any disclaimer, the term of this patent is extended or adjusted under 35 U.S.C. 154(b) by 598 days.

(21) Appl. No.: 17/469,905

(22) Filed: Sep. 9, 2021

(65) Prior Publication Data

US 2021/0402518 A1 Dec. 30, 2021

Related U.S. Application Data

(63) Continuation of application No. PCT/EP2020/055730, filed on Mar. 4, 2020.

(30) Foreign Application Priority Data

Mar. 12, 2019 (DE) .................. 10 2019 203 350

(51) Int. Cl.
*B23K 26/21* (2014.01)
*B23K 26/03* (2006.01)
(Continued)

(52) U.S. Cl.
CPC ............ *B23K 26/21* (2015.10); *B23K 26/032* (2013.01); *B23K 26/073* (2013.01);
(Continued)

(58) Field of Classification Search
CPC .... B23K 26/21; B23K 26/032; B23K 26/073; B23K 26/0876; B23K 2101/32;
(Continued)

(56) References Cited

U.S. PATENT DOCUMENTS

2013/0119026 A1 5/2013 Hesse et al.
2013/0223792 A1* 8/2013 Huber ................ G02B 6/02042
385/127
(Continued)

FOREIGN PATENT DOCUMENTS

CN 103228400 A 7/2013
DE 102016009475 A1 2/2018
(Continued)

OTHER PUBLICATIONS

Coherent, Inc., "HighLight FL-ARM Adjustable Ring Mode Fiber Laser," *Datasheet Coherent, Inc.*, Dec. 2018, Coherent Inc., Santa Clara, USA.
(Continued)

*Primary Examiner* — Robert G Bachner
(74) *Attorney, Agent, or Firm* — LEYDIG, VOIT & MAYER, LTD.

(57) ABSTRACT

A hairpin welding method welds wire ends of at least two copper wires, arranged flush next to one another, to one another by a laser beam. The laser beam is generated with a beam cross section that impinges on the wire ends at an end side and has a round core region and a ring region surrounding the round core region. A ratio of an external diameter of the ring region to a diameter of the core region is between 7:1 and 2:1. A ratio of a laser power in the core region to a laser power in the ring region is between 10:90 and 70:30.

15 Claims, 1 Drawing Sheet

(51) Int. Cl.
 *B23K 26/073* (2006.01)
 *B23K 26/08* (2014.01)
 *B23K 101/32* (2006.01)
 *B23K 103/12* (2006.01)

(52) U.S. Cl.
 CPC ...... *B23K 26/0876* (2013.01); *B23K 2101/32* (2018.08); *B23K 2103/12* (2018.08)

(58) Field of Classification Search
 CPC ............ B23K 2103/12; B23K 2101/38; B23K 26/0626; B23K 26/244; B23K 26/32; B23K 26/22
 See application file for complete search history.

(56) References Cited

U.S. PATENT DOCUMENTS

| | | |
|---|---|---|
| 2014/0097161 A1 | 4/2014 | Watanabe |
| 2016/0016263 A1 | 1/2016 | Burbaum et al. |
| 2016/0361782 A1* | 12/2016 | Saito .................. B23K 26/0622 |
| 2018/0036836 A1* | 2/2018 | Nakamura ......... B23K 26/0736 |
| 2019/0262942 A1 | 8/2019 | Haug et al. |
| 2020/0025608 A1 | 1/2020 | Kramer et al. |
| 2020/0067388 A1 | 2/2020 | Zeadan et al. |

FOREIGN PATENT DOCUMENTS

| | | |
|---|---|---|
| DE | 102016222357 A1 | 5/2018 |
| DE | 102016222385 A1 | 5/2018 |
| EP | 3292940 A1 | 3/2018 |
| JP | H 04220186 A | 8/1992 |
| JP | 2015188900 A | 11/2015 |
| JP | 2018051607 A | 4/2018 |

OTHER PUBLICATIONS

Coherent, Inc., "Improving Fiber Laser Weld quality and Yield with CleanWeld," *A Coherent White Paper*, Dec. 2018, Coherent, Inc., Santa Clara, USA.

\* cited by examiner

HAIRPIN WELDING METHOD AND APPARATUS

CROSS REFERENCE TO RELATED APPLICATIONS

This application is a continuation of International Application No. PCT/EP2020/055730 (WO 2020/182578 A1), filed on Mar. 4, 2020, and claims benefit to German Patent Application No. DE 10 2019 203 350.4, filed on Mar. 12, 2019. The aforementioned applications are hereby incorporated by reference herein.

FIELD

The present invention relates to a hairpin welding method and a hairpin welding apparatus.

BACKGROUND

A hairpin welding method is disclosed by EP 3 292 940 A1, for example.

In order to form stators in electric motors, a stator cage may be formed from an insulating material, and so-called hairpins composed of an electrically conductive material, preferably copper, may be introduced into the cage. The hairpins can be embodied in clip-shaped or linear fashion, for example, and, after they have been introduced into the stator cage, they are present in the stator cage parallel to one another and substantially in the axial direction of the stator or of the electric motor. A multiplicity of such hairpins are introduced into the stator cage around the periphery of the stator cage, the hairpins initially not being mechanically and electrically connected to one another during mounting or manufacture. After having been introduced into the stator cage and after possible reshaping and/or shortening and a possible pretreatment, for example stripping of any coatings, the respective free ends of the hairpins are then joined together, preferably in pairs, to form a complete stator winding, for example by welding. The joining produces both a mechanical connection and an electrically conductive connection between the free ends of the respective pairs of hairpins, such that the hairpins initially present individually after having been introduced are now connected. The joining of the hairpins makes it possible to form a mechanically and electrically interconnected, continuous stator winding.

The hairpins usually have a square or rectangular cross section, the cross-sectional area of which is significantly greater than that of a wire formed for winding. An increased current flow by comparison with a wire is made possible as a result. The increase in the performance of electric motors that is thus achievable is advantageous particularly in the case of electric motors for motor vehicles since the latter have to satisfy very stringent performance requirements.

The welding of hairpins for manufacturing electric motors in the emobility field is usually a laser-based method in which the ends of two copper wires having a rectangular cross section are welded to one another at the end side. This usually involves the use of an NIR laser with a top-hat beam profile in combination with a beam oscillation technique as described in EP 3 292 940 A1. In this case, the welding process gives rise to both spatter, which leads to contaminations on surrounding components and increases the short-circuit risk thereof, and pores in the weld seam (weld bead), which reduce the electrical conductivity and the mechanical strength. The spatter and pores lead to high reject rates in electric motor manufacture.

SUMMARY

In an embodiment, the present disclosure provides a hairpin welding method that welds wire ends of at least two copper wires, arranged flush next to one another, to one another by a laser beam. The laser beam is generated with a beam cross section that impinges on the wire ends at an end side and has a round core region and a ring region surrounding the round core region. A ratio of an external diameter of the ring region to a diameter of the core region is between 7:1 and 2:1. A ratio of a laser power in the core region to a laser power in the ring region is between 10:90 and 70:30.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
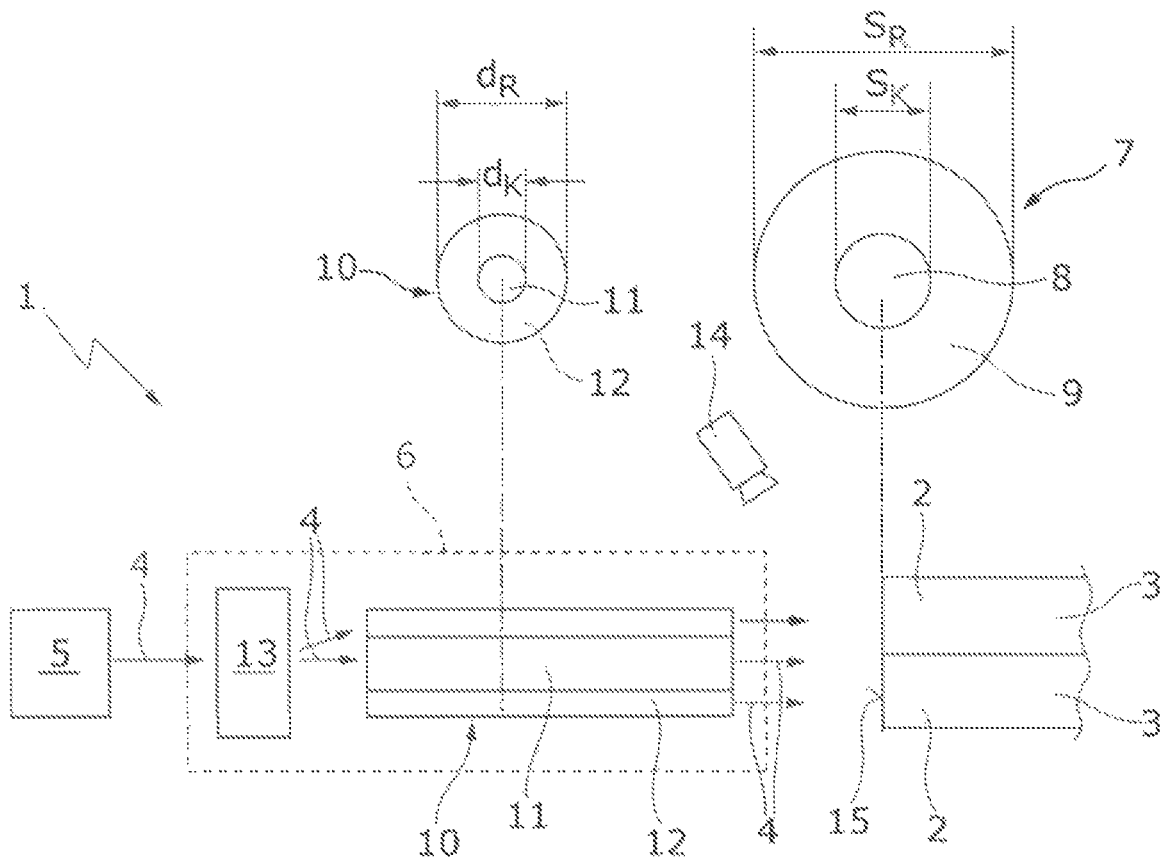
FIG. 1 schematically shows a hairpin welding apparatus according to the invention for welding hairpins.

The present disclosure relates to a hairpin welding method, e.g., in which the wire ends of at least two copper wires—the wire ends being arranged flush next to one another—are welded to one another by a laser beam, and an associated hairpin welding apparatus.

Embodiments of the present disclosure provide hairpin welding method that reduces the occurrence of spatter and pores, and an associated hairpin welding apparatus.

These aspects are achieved by virtue of the fact that a laser beam is generated with a beam cross section that impinges on the wire ends at the end side, and that has a round core region and a ring region surrounding, in particular directly, the core region, wherein:
  the ratio of the external diameter of the ring region to the diameter of the core region is between 7:1 and 2:1, preferably between 5:1 and 2:1, particularly preferably approximately 4:1, approximately 3.5:1, approximately 3:1 or approximately 2.6:1, and
  the ratio of the laser power in the core region to the laser power in the ring region is between 10:90 and 70:30, preferably between 25:75 and 50:50, particularly preferably approximately 30:70.

According to embodiments of the present the invention, the beam cross section has an inner core region and an outer ring region, which are in a specific size and intensity ratio to one another and which influence the process in such a way that significantly fewer pores and less spatter arise. Instabilities of an elongated keyhole result in spatter if the keyhole forms a protuberance, an excess pressure arises and the melt is then ejected explosively through the opening keyhole. If instabilities in the elongated keyhole produce protuberances at the lower end which become detached, pores arise, wherein implosions at the end of the process increasingly result in pores. The laser power in the ring region results in the stabilization of the keyhole and thus the stabilization of the melt pool dynamics, thereby reducing the arising of spatter. The laser power in the ring region results in a conically opened keyhole, or keyhole widened at the top, which can be constricted to a lesser extent in the lower region and thus improves the degassing and counteracts the arising of pores. Experiments have shown that it is particularly advantageous to have a required power proportion in the core region of 10-50% in order to reduce spatter and a required power proportion in the core of 10-30% in order to reduce pores. A power proportion in the core region of approximately 30% has been found to be optimal.

In a preferred embodiment, the laser power in the core region is at least 0.9 kW in order to produce a keyhole reliably in the process. The wavelength is 1030 nm, for example, but other wavelengths are also possible, such as e.g. 515 nm or 450 nm.

As has furthermore been shown by experiments, the spot diameter on the wire ends can also be set optimally for hairpin welding. Preferably, the spot diameter of the core region is between 50 µm and 340 µm, preferably between 75 µm and 200 µm, in particular approximately 85 µm, approximately 136 µm or 170 µm, and the spot external diameter of the ring region is between 250 µm and 1200 µm, preferably between 300 µm and 700 µm, preferably approximately 340 µm, approximately 408 µm, approximately 442 µm or approximately 680 µm. A spot diameter of the core region of 85 µm and a spot external diameter of the ring region of 340 µm have been found to be optimal.

Preferably, the laser beam is moved on the two end faces of the wire ends, in particular in always the same linear movement or in always the same circular path ("beam oscillation"), in order to produce a molten weld bead on the two end faces. The speed ("oscillation advance") at which the laser beam moves on the two end faces of the wire ends is advantageous between 200 mm/s and 1600 mm/s, wherein the best results were achieved at 800 mm/s.

In one particularly preferred method variant, the beam cross section which impinges on the wire ends is generated by means of a double fiber having a core fiber and a ring fiber surrounding the core fiber. In this case, the laser beam is coupled into both the core and the ring fiber, wherein the laser power coupled into the double fiber is divided between the core fiber and the ring fiber in a ratio of between 10:90 and 50:50, preferably between 20:80 and 40:60, particularly preferably in a ratio of approximately 30:70.

Preferably, the ratio of the external diameter of the ring fiber to the diameter of the core fiber is between 5:1 and 3:1, preferably approximately 4:1. Preferably, the diameter of the core fiber is between 25 µm and 250 µm, preferably between 50 µm and 200 µm, particularly preferably approximately 50 µm, approximately 80 µm, approximately 100 µm or approximately 200 µm, and the external diameter of the ring fiber is between 150 µm and 800 µm, preferably between 200 µm and 700 µm, particularly preferably approximately 200 µm, approximately 240 µm, approximately 260 µm, approximately 400 µm or approximately 700 µm. This can be implemented for example with a double fiber having diameters of 100 µm/400 µm or having diameters of 50 µm/200 µm. Further diameter ratios can be used, thus e.g. 100 µm/260 µm or 80 µm/240 µm or the like. It has been found in experiments that the process efficiency can be increased by the use of a 50 µm/200 µm fiber in comparison with a 100 µm/400 µm fiber for the same projection, which in turn results in shorter process times for the same laser power.

The laser beam can be positioned on the wire ends by means of a camera-based sensor system, in order in particular to be able to adapt the oscillation position and geometry according to the joining situation.

The invention also relates to a hairpin welding apparatus for welding wire ends of two copper wires, the wire ends being arranged flush next to one another, by means of a laser beam, comprising a laser beam generator for generating the laser beam, and comprising a beam shaping optical unit arranged in the beam path of the laser beam and serving for generating a beam cross section on the wire ends which has a round core region and a ring region surrounding, in particular directly, the core region.

Further advantages and advantageous configurations of the subject matter of the invention are evident from the description, the claims and the drawings. Likewise, the features mentioned above and those presented below can each be used by themselves or as a plurality in any designed combinations. The embodiments shown and described should not be understood as an exhaustive enumeration, but rather are of exemplary character for outlining the invention.

The hairpin welding apparatus 1 shown in FIG. 1 serves for welding wire ends 2 of two copper wires 3, the wire ends being arranged flush next to one another, by means of a laser beam 4. The hairpin welding apparatus 1 comprises a laser beam generator 5 generating the laser beam 4 (wavelength 1030 nm, power 5 kW) and a beam shaping optical unit 6 arranged in the beam path of the laser beam 4 and serving for generating a beam cross section 7 on the wire ends 2 which has a circular core region 8 and a circular ring region 9 directly surrounding the core region 8.

The beam shaping optical unit 6 is formed by a double fiber 10 comprising a core fiber 11 and comprising a ring fiber 12 surrounding the core fiber 11, and also by an input coupling optical unit 13, e.g. in the form of a wedge plate arranged in the beam path, which couples the laser beam 4 simultaneously into the core fiber 8 and into the ring fiber 9. The diameter ratio $d_R/d_K$ of the ring fiber 12 to the core fiber 11 is preferably 4:1, which can be implemented for example with a double fiber 10 having diameters of 200 µm/50 µm or having diameters of 400 µm/100 µm. The input coupling optical unit 13 couples the laser beam 4 simultaneously into both the core and the ring fiber 11, 12, specifically in a ratio of approximately 30:70 between the core fiber 8 and the ring fiber 9. Given a magnification of 1.7:1, in the case of a double fiber 10 having diameters of 50 µm/200 µm, the spot diameter $s_K$ of the core region 8 on the wire ends 2 is approximately 85 µm and the spot external diameter $s_R$ of the ring region 9 on the wire ends 2 is approximately 340 µm.

The laser beam 4 is positioned on the wire ends 2 by means of a camera-based sensor system 14.

Figure 2A:
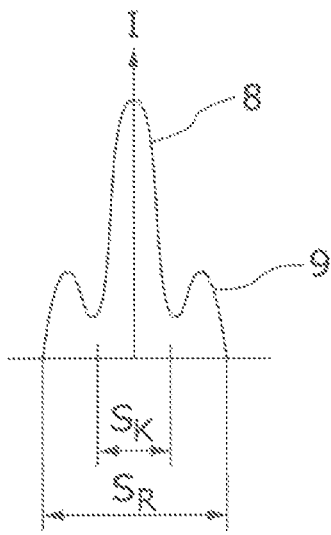
FIG. 2a and FIG. 2b show two intensity profiles of the laser beam impinging on the hairpins.
Figure 2B:
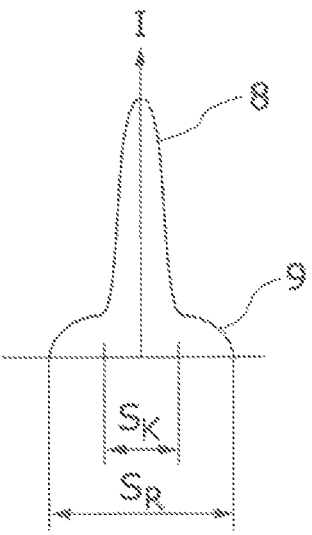

FIGS. 2a, 2b show two possible intensity profiles of the laser beam 4 impinging on the two end faces 15 of the wire ends 2. In FIG. 2a the ring region 9 has its own intensity maximum, whereas in FIG. 2b the intensity in the ring region 9 continuously decreases radially toward the outside. As shown by x-ray measurements, the laser power in the ring region 9 results in a conically opened keyhole which cannot be constricted in the lower region and thus improves the degassing and counteracts the arising of pores. The laser power in the ring region 9 results in the stabilization of the keyhole and thus the stabilization of the melt pool dynamics, thereby reducing the arising of spatter and pores.

Figure 3:
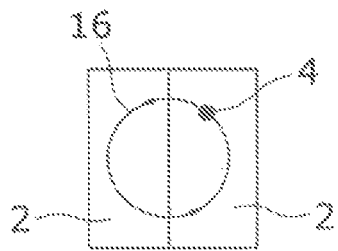
FIG. 3 shows oscillations of the laser beam on the end faces of the hairpins.

The laser beam 4 traverses the two end faces 15 of the wire ends 2 in always the same linear movement or, as is shown in FIG. 3, in always the same circular path ("beam oscillation") 16, in order to produce a molten weld bead on the two end faces 15. The laser beam 4 thus moves in a circle at the same location, wherein the circle diameter corresponds almost to the width of the two end faces 15. The speed ("oscillation advance") at which the laser beam 4 moves on the two end faces 15 is optimally 800 mm/s.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hairpin welding method in which wire ends of at least two copper wires are arranged flush next to one another and are welded to one another by a laser beam, the method comprising:
    generating the laser beam with a beam cross section which impinges on the wire ends at an end side, wherein the beam cross section has a round core region and a ring region surrounding, the round core region, wherein:
    a ratio of an external diameter of the ring region to a diameter of the core region is between 5:1 and 2:1
    a spot diameter of the core region at the wire ends is between 50 µm and 200 µm, and
    a spot external diameter of the ring region at the wire ends is between 250 µm and 700 µm.

2. The hairpin welding method as claimed in claim 1, wherein the laser power in the core region is at least 0.9 kW.

3. The hairpin welding method as claimed in claim 1, the method further comprising moving the laser beam on two end faces of the wire ends, in a same circular path, in order to produce a molten weld bead on the two end faces.

4. The hairpin welding method as claimed in claim 3, wherein a speed at which the laser beam moves on the two end faces of the wire ends is between 200 mm/s and 1600 mm/s.

5. The hairpin welding method as claimed in claim 1, wherein the beam cross section which impinges on the wire ends is generated by a double fiber having a core fiber and a ring fiber surrounding the core fiber, wherein the laser beam is coupled into both the core fiber and the ring fiber, and wherein a laser power coupled into the double fiber is divided between the core fiber and the ring fiber in a ratio of between 10:90 and 50:50.

6. The hairpin welding method as claimed in claim 5, wherein a ratio of an external diameter of the ring fiber to a diameter of the core fiber is between 5:1 and 3:1.

7. The hairpin welding method as claimed in claim 5, wherein a diameter of the core fiber is between 25 µm and 250 µm.

8. The hairpin welding method as claimed in claim 5, wherein an external diameter of the ring fiber is between 150 µm and 800 µm.

9. The hairpin welding method as claimed in claim 1, wherein the laser beam is positioned on the wire ends by a camera-based sensor system.

10. A hairpin welding apparatus for welding wire ends of two copper wires by a laser beam, the wire ends being arranged flush next to one another, the apparatus comprising:
    a laser beam generator configured to generate the laser beam, and
    a beam shaping optical unit arranged in the beam path of the laser beam and configured to generate a beam cross section on the wire ends which has a round core region and a ring region surrounding the core region,
    wherein a ratio of an external diameter of the ring region to a diameter of the core region is between 5:1 and 2:1, a spot diameter of the core region at the wire ends is between 50 µm and 200 µm, and a spot external diameter of the ring region at the wire ends is between 250 µm and 700 µm.

11. The hairpin welding apparatus as claimed in claim 10, wherein the beam shaping optical unit has a double fiber comprising a core fiber and a ring fiber surrounding the core fiber, and wherein the beam shaping optical unit also has an input coupling optical unit configured to couple the laser beam simultaneously into the core fiber and the ring fiber.

12. The hairpin welding apparatus as claimed in claim 11, wherein a ratio of an external diameter of the ring fiber to a diameter of the core fiber is between 5:1 and 3:1.

13. The hairpin welding apparatus as claimed in claim 11, wherein a diameter of the core fiber is between 25 µm and 250 µm.

14. The hairpin welding apparatus as claimed in claim 11, wherein an external diameter of the ring fiber is between 150 µm and 800 µm.

15. The hairpin welding apparatus as claimed in claim 11, comprising a camera-based sensor system, which is configured to position the laser beam on the wire ends.

* * * * *